(12) United States Patent
Malkowski et al.

(10) Patent No.: US 10,315,847 B2
(45) Date of Patent: Jun. 11, 2019

(54) EXTRUDED SLAT/LINK CONVEYANCE CHAIN

(71) Applicant: PRINCE CASTLE LLC, Carol Stream, IL (US)

(72) Inventors: Dennis Malkowski, Yorkville, IL (US); Karl Ronald Heinze, Chicago, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 536 days.

(21) Appl. No.: 14/986,522

(22) Filed: Dec. 31, 2015

(65) Prior Publication Data
US 2016/0185530 A1 Jun. 30, 2016

Related U.S. Application Data

(60) Provisional application No. 62/099,146, filed on Dec. 31, 2014.

(51) Int. Cl.
*A47J 37/08* (2006.01)
*B65G 17/06* (2006.01)
*B65G 17/42* (2006.01)

(52) U.S. Cl.
CPC .......... *B65G 17/42* (2013.01); *A47J 37/0857* (2013.01); *B65G 17/067* (2013.01)

(58) Field of Classification Search
CPC ...... B65G 17/42; B65G 17/067; B65G 15/52; A47J 37/0857
USPC ....... 99/386, 443 C; 198/848–849, 850–851, 198/853
See application file for complete search history.

(56) References Cited

U.S. PATENT DOCUMENTS

| | | | | |
|---|---|---|---|---|
| 861,484 A | * | 7/1907 | Stewart | B65G 17/06 |
| 2,987,167 A | | 6/1961 | Franz | |
| 3,098,875 A | * | 7/1963 | Schmerling | C07C 45/49 556/182 |
| 3,447,668 A | * | 6/1969 | Jernigan | B65G 17/067 198/834 |
| 3,693,452 A | * | 9/1972 | McGinley | A47J 37/044 219/388 |
| 4,281,594 A | * | 8/1981 | Baker | A47J 37/044 99/386 |
| 4,394,901 A | | 7/1983 | Roinestad | |

(Continued)

FOREIGN PATENT DOCUMENTS

JP    H06-141985 A    5/1994

OTHER PUBLICATIONS

"Patent Translate", EPO and Google. (Year: 2018).*

*Primary Examiner* — Mark A Deuble
(74) *Attorney, Agent, or Firm* — Marshall, Gerstein & Borun LLP

(57) ABSTRACT

A conveyor belt system that provides a continuous flat support surface for a food item that grips the food item when compressed against a reactive surface. The conveyor belt system comprises a conveyor belt and a reactive surface, the conveyor belt having a top side and a bottom side, the top side being parallel to the reactive surface and facing the reactive surface. The conveyor belt further comprises a plurality of spaced rods and a plurality of flat metal slats, each slat having a leading edge and a trailing edge relative to a direction of conveyance travel of the conveyor belt, the leading edge of the slat coupled to one of the plurality of rods to provide a hinged joint at the leading edge of the slat.

17 Claims, 11 Drawing Sheets

(56) References Cited

U.S. PATENT DOCUMENTS

| | | | |
|---|---|---|---|
| 4,473,365 A | 9/1984 | Lapeyre | |
| 5,307,923 A | 5/1994 | Damkjaer | |
| 5,358,095 A * | 10/1994 | Curl | B65G 17/44 171/131 |
| 5,473,975 A * | 12/1995 | Bruno | A47J 37/044 219/388 |
| 5,588,354 A * | 12/1996 | Stuck | A47J 37/044 99/349 |
| 6,223,889 B1 | 5/2001 | Layne et al. | |
| 6,311,610 B1 * | 11/2001 | Kettman | A47J 37/0857 219/388 |
| 6,581,758 B1 | 6/2003 | van-Zijderveld et al. | |
| 6,707,014 B1 * | 3/2004 | Corey | A23L 3/185 198/844.1 |
| 6,918,486 B2 | 7/2005 | Shibayama et al. | |
| 7,278,535 B2 | 10/2007 | Damkjaer | |
| 7,314,132 B2 | 1/2008 | Layne et al. | |
| 7,419,051 B2 | 9/2008 | Damkjaer | |
| 7,530,455 B2 | 5/2009 | Lucchi | |
| 7,708,135 B2 | 5/2010 | Ellerth et al. | |
| 7,721,877 B2 | 5/2010 | Maine, Jr. et al. | |
| 7,878,323 B2 | 2/2011 | Van Rees et al. | |
| 7,975,840 B2 | 7/2011 | Messick, Jr. et al. | |
| 7,987,972 B2 | 8/2011 | Hennigar et al. | |
| 8,113,340 B1 | 2/2012 | Smith et al. | |
| 8,499,928 B1 | 8/2013 | Liao et al. | |
| 8,506,687 B2 | 8/2013 | Jones | |
| 8,752,698 B2 | 6/2014 | Lasecki et al. | |
| 8,863,944 B2 | 10/2014 | MacLachlan | |
| 8,939,279 B2 | 1/2015 | Porter et al. | |
| 9,073,694 B2 | 7/2015 | Ozaki | |
| 9,221,611 B2 | 12/2015 | Ulchak et al. | |
| 2004/0211323 A1 * | 10/2004 | Heinzen | A21B 1/48 99/349 |
| 2010/0275789 A1 | 11/2010 | Lee et al. | |
| 2011/0277643 A1 * | 11/2011 | Schwierking | A47J 36/32 99/331 |
| 2015/0129395 A1 | 5/2015 | Messick, Jr. | |
| 2015/0151919 A1 | 6/2015 | Messick, Jr. et al. | |
| 2015/0191312 A1 | 7/2015 | Ulchak et al. | |
| 2016/0185529 A1 | 6/2016 | Bauer | |
| 2016/0185530 A1 | 6/2016 | Malkowski et al. | |

* cited by examiner

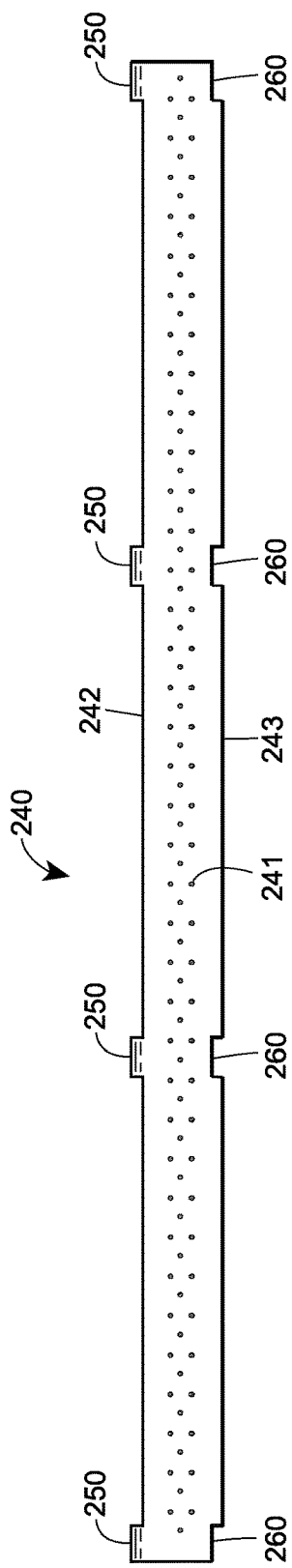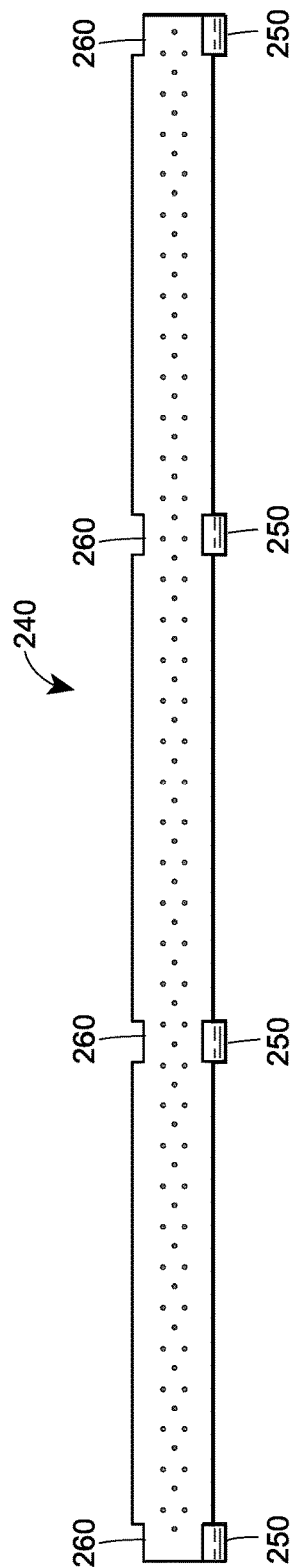
FIG. 5A
FIG. 5B

EXTRUDED SLAT/LINK CONVEYANCE CHAIN

CROSS REFERENCE TO RELATED APPLICATION

The benefit under 35 U.S.C. § 119(e) of U.S. provisional patent application Ser. No. 62/099,146, filed Dec. 31, 2014, the entire disclosure of which is incorporated herein by reference, is hereby claimed.

FIELD OF THE INVENTION

The present invention is directed to a wire conveyor belt having a plurality of slats and configured to receive and compress a food product against a reactive surface without leaving marks or deforming the food product.

BACKGROUND

A conveyor toaster is a well-known cooking device that uses a heated platen and a slowly rotating conveyor belt. The conveyor belt urges food product (being carried by the conveyor belt) against the platen while it simultaneously pulls the food product across the platen's hot surface. By virtue of its design, a conveyor toaster is able to process food products continuously as opposed to the toasters commonly used by consumers that process food products in batch mode. Conveyor toasters are ill-suited for consumer use because of their size, manufacturing cost, power requirements, and the time required to pre-heat the platen to operating temperature. They are preferred, however, by restaurants and food services that require high-volume through-put and consistent heating/toasting.

Wire conveyor belts used in conveyor toasters and in other fields of technology have been known for many years. Wire conveyor belts are ideal for material handling, cooking, icing, slicing breading, cooling, filling, inspecting, and packing of products like breads, rolls, buns, donuts, confections, cakes, pies, pastries, meat, seafood, poultry, and other processed foods. The simple, open design of wire conveyor belts provides efficient operation with minimum maintenance and easy cleanup to meet sanitation requirements. With reference to FIGS. 1 and 2, a known exemplary wire conveyor belt 10 comprising a plurality of spaced metal rods 16 interconnected by coupling "hook" and "loop" connection elements 18, 20 formed at the rod ends of adjacent metal rods is illustrated. In the conveyor belt 10, the rods 16 support a food product to be conveyed and hold the components of the belt together by way of the interconnected hook and loop connection elements 18, 20.

Wire conveyor belts and conveyor toasters, however, create a number of problems in the food industry. It has been found, for example, in some instances that the rods of a wire conveyor belt can undesirably leave a mark on a food product that runs on top of the belt which can damage the food product and/or render it aesthetically unpleasing to the retailer or the consumer at the point of sale. The markings often become prominent if the product is heated while it is on the belt and/or put under pressure, particularly when the product being conveyed is naturally soft or pliable, such as with many food products processed using conveyor toasters. Since product appearance is an important part of any food item, the marking can be a barrier to the use of a conventional wire conveyor belt to carry food products.

To overcome the marking problems, some conveyor belts include metal plates that attach to the metal rods to provide a uniformly flat support surface. One such conveyor belt, for example, is the wire conveyor belt disclosed in U.S. Pat. No. 7,987,972, which is herein incorporated by reference in its entirety. This design provides a flat support surface, but is relatively expensive to produce and can create gaps between the plates that can mark or even deform a food product. The plates in the belt are attached to a first spaced rod at a first end and to a second spaced rod that is adjacent to the first spaced rod at the second end. Gaps are naturally created in the conveyor belt when the plates rotate about a driving mechanism. These gaps can allow for the food product to be pinched when the plates come together after the belt already has been loaded with a food product.

Accordingly, there exists a need in the marketplace for a conveyor belt system that is capable of heating and placing a food product under a compressive force without substantially marking or pinching the food product.

BRIEF DESCRIPTION OF THE DRAWINGS

FIG. 5A is a perspective view of an alternative metal slat illustrating the top surface thereof, and FIG. 5B is a perspective view of the alternative metal slat of FIG. 5A, illustrating the bottom surface thereof.

DETAILED DESCRIPTION

A conveyor belt system, disclosed herein, heats and places a food product under a compressive force without substantially marking or pinching the food product. According to the disclosure and illustrated generally in FIG. 3, a conveyor belt system 100 provides a continuous flat support surface for conveying an item, particularly a food item, and includes a conveyor belt 110 that is structured and arranged to receive, grip, retain, and compress the item against a reactive surface 111.

Figure 1:
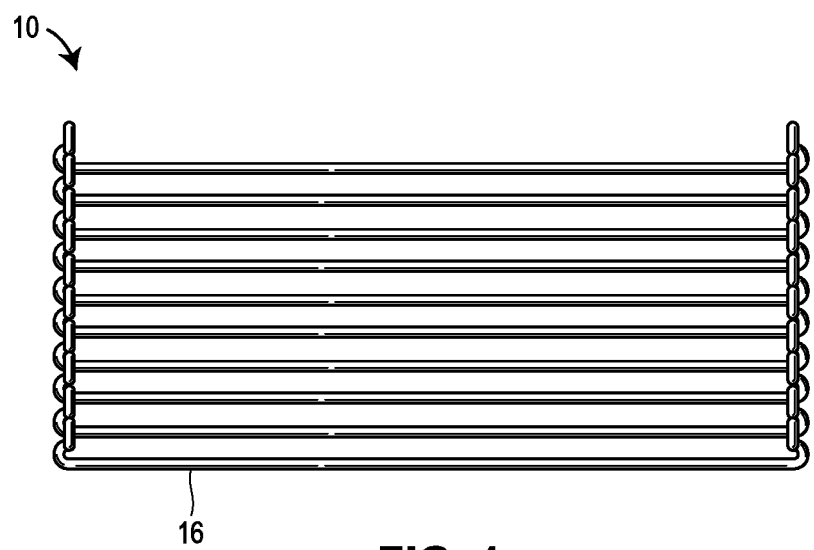
FIG. 1 is a top view of a segment of a known, conventional wire conveyor belt.
Figure 2:
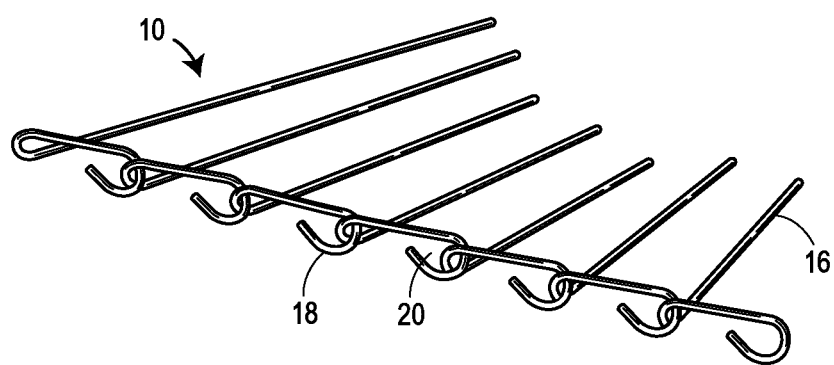
FIG. 2 is a side perspective view of the wire conveyor belt segment shown in FIG. 1.
Figure 3:
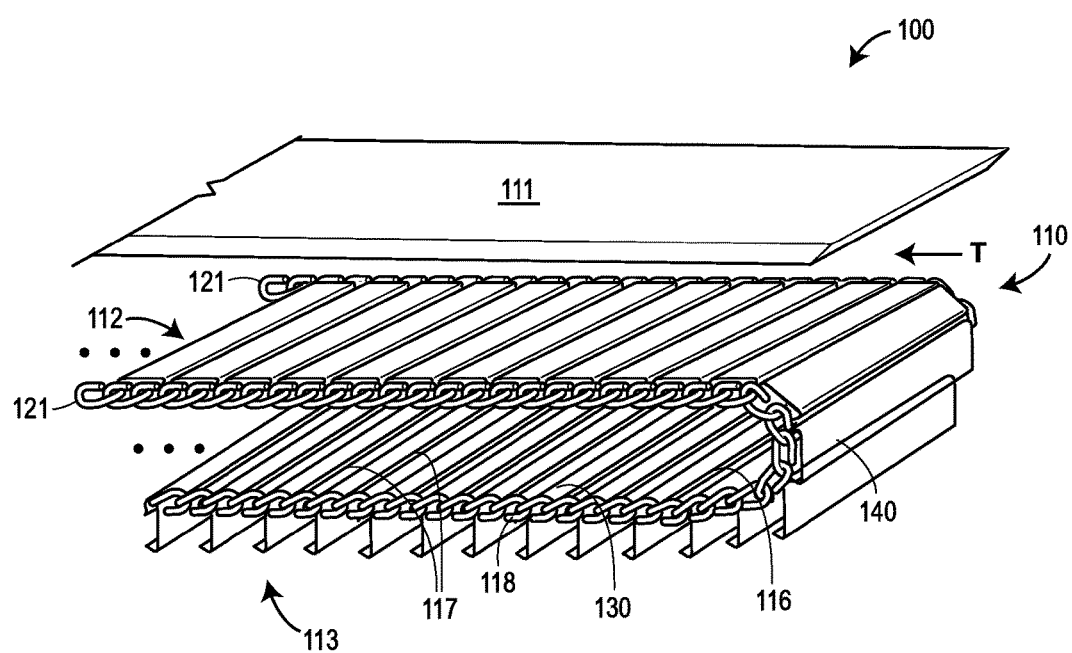
FIG. 3 is a perspective view of a conveyor belt system according to the invention, the system comprising the conveyor belt of FIG. 1 and a plurality of metal slats coupled thereto and an opposing reactive surface.

Referring to FIG. 3, the conveyor belt 110 comprises a plurality of spaced metal rods 116 disposed in succession and transversely with respect to a direction of conveyance travel T as represented by arrow T of the belt 110. In the illustrated embodiment, the plurality of spaced rods 116 are provided by a conventional wire conveyor belt (such as the belt 10 depicted in FIG. 1) which essentially serves as a scaffolding for a plurality of metal slats 140 discussed in more detail below. Other scaffoldings capable of receiving metal slats 140 may also be used. Each rod 116 has two end portions 121 and a supporting rod portion extending there between. Each end portion 121 comprises a terminal hook connection element 118 that protrudes in a first direction, curves, and extends in a direction substantially opposite to the first direction for a predetermined distance. Each rod 116 also has two loop connection elements 120, which are formed in the rods themselves. As best shown in FIG. 2, the hook connection elements 18, 118 are interconnected/ coupled to loop connection elements 20, 120 of an adjacent spaced metal rod 16, 116 so as to interlock the adjacent spaced metal rods 16, 116. The rods 116 are preferably formed from a suitable metal such as copper, iron, aluminum, and nickel, and/or using a suitable alloy such as steel, brass, and bronze. Stainless steel is a preferred material for manufacturing the metal rods 116 and AISI T-304 is an exemplary type of stainless steel that may be used.

Referring back to FIG. 3, the conveyor belt 110 comprises the plurality of spaced metal rods 116 and the plurality of substantially flat metal slats 140. The conveyor belt 110 includes a top side, or support surface, 112 and a bottom side 113. The top side 112 provides the flat support surface for conveying a food product, and the bottom side 113 functions as a return section of the conveyor belt 110.

Figure 4A:
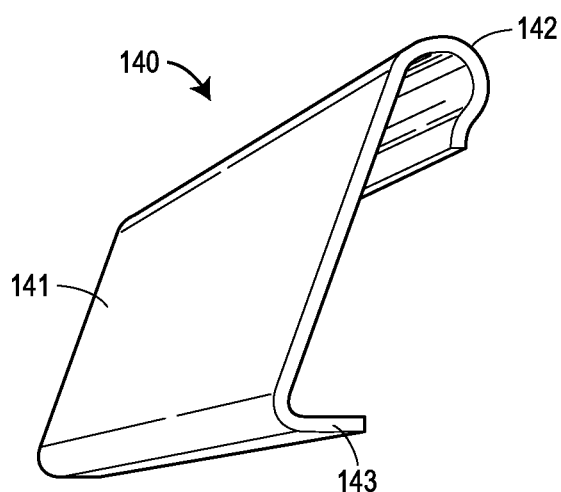
FIG. 4A is a perspective view of a metal slat.
Figure 4B:
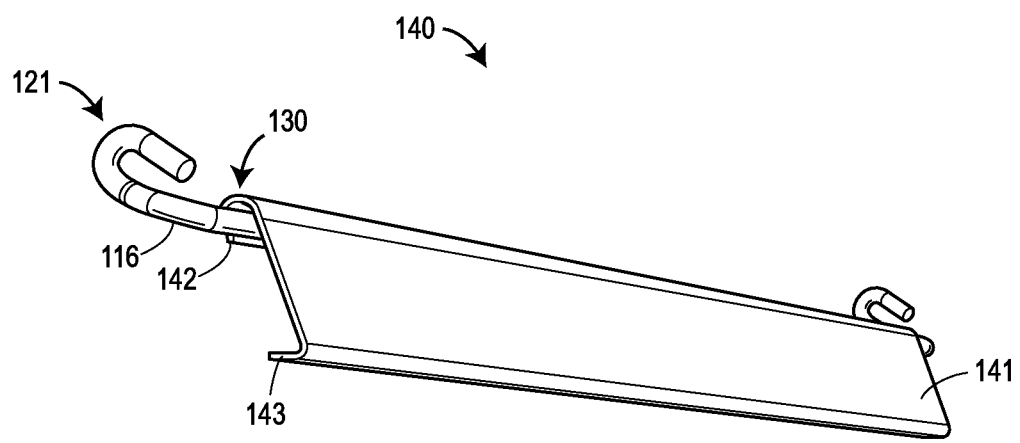
FIG. 4B is a perspective view of the metal slat of FIG. 4A coupled to a conveyor belt metal rod.

The support surface 112 is formed by the plurality of metal slats 140 which are coupled to selected rods of the plurality of spaced metal rods 116. As illustrated in FIG. 3, the slats 140 are coupled to a first spaced rod of the plurality of spaced rods 116 and extend over at least a second spaced rod, the second spaced rod being adjacent to the first spaced rod and supporting the metal slat 140 and the trailing edge is unsecured and free of any attachment, so as to provide a hinged joint arranged to provide partial rotation at the leading edge of each slat In FIG. 4A, each metal slat 140 includes a slat base portion 141 having a leading edge 142 and a trailing edge 143 relative to the direction of conveyance travel, for example, the direction of travel T of FIG. 3. Each metal slat 140 attaches to the conveyor belt 110 by coupling the leading edge 142 to one of the plurality of metal rods 116. Further, the trailing edge 143 is unsecured and free of any attachment, so as to provide a hinged joint 130 arranged to provide partial rotation at the leading edge of each slat, as illustrated in FIG. 4B. As better illustrated in FIG. 4A, the trailing edge 143 is bent inwardly and does not couple to the rod 116 of the conveyor belt 110. Instead, the trailing edge 143 provides a rounded, curved, or angled edge that advantageously reduces any gap between the trailing edge 143 of the slat 140 and the following, adjacent hinged joint 130 of the conveyor belt 110, as illustrated in FIG. 3. The slats 140 are preferably formed from a metal material, such as stainless steel, or any other suitable material. For example, the slats 140 can be manufactured from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates.

FIGS. 5A and 5B illustrate an alternative slat 240. Slat 240 comprises multiple channel portions 250 protruding from leading edge 242, each channel portion 250 comprising a u-shaped hook member. The slats 240 further comprise multiple notches 260 along the trailing edge 243, the notches 260 being disposed in positions along the trailing edge 243 that correspond to the positions of the channel portions 250 protruding from the leading edge 242.

In the conveyor belt system 100 of FIG. 3, the surface of the slats 140 is generally smooth. The top surface may, however, be corrugated or textured to better grip an item. Illustrated in FIG. 5A, the top surface of the alternative conveyor belt slats 240 may therefore include gripping features 241 to retain an item while the item is transported to facilitate the frictional engagement of the food product urged against the reactive surface 111. The roughness of the surface of the slats 240 in one embodiment may be provided by shot peening the surfaces of the slats 240 using a predetermined shot size, as is disclosed in U.S. Application Publication No. US 2010/0275789 A1, which is herein incorporated by reference in its entirety. Alternatively, the surface of the slat 240 may have gripping features 241 such as an abrasive coating, dimples, furrows, or protrusions that would be strong enough to grip the food product, but not so abrasive that the gripping features rip, tear, or mark the food product.

Figure 7:
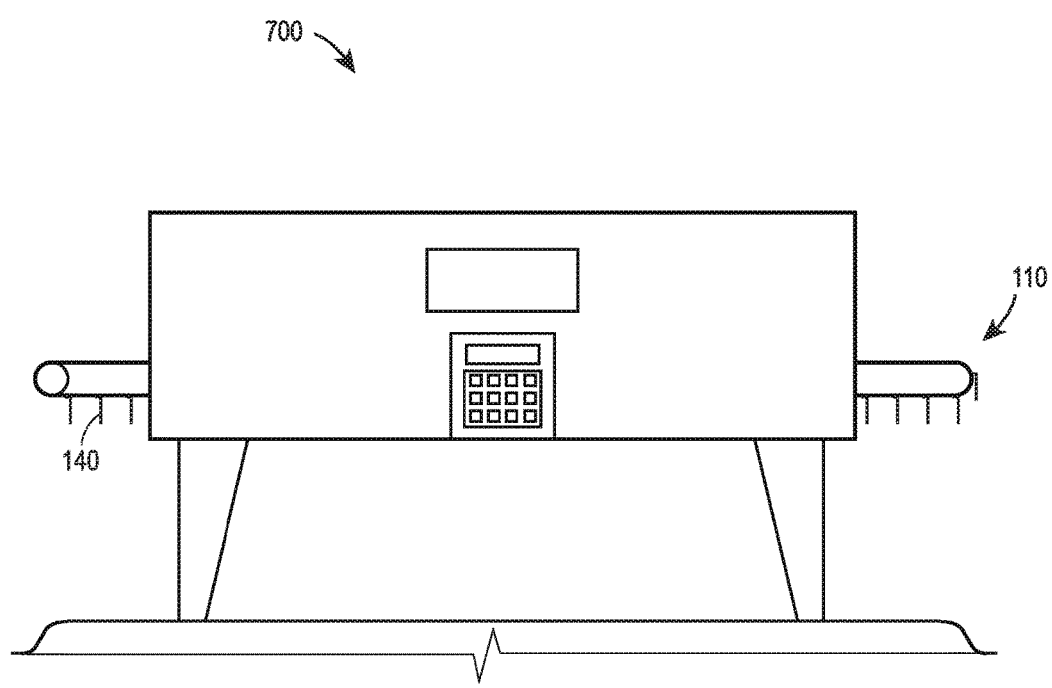
FIG. 7 is a horizontal toaster comprising the conveyor belt system of FIG. 3.
Figure 8:
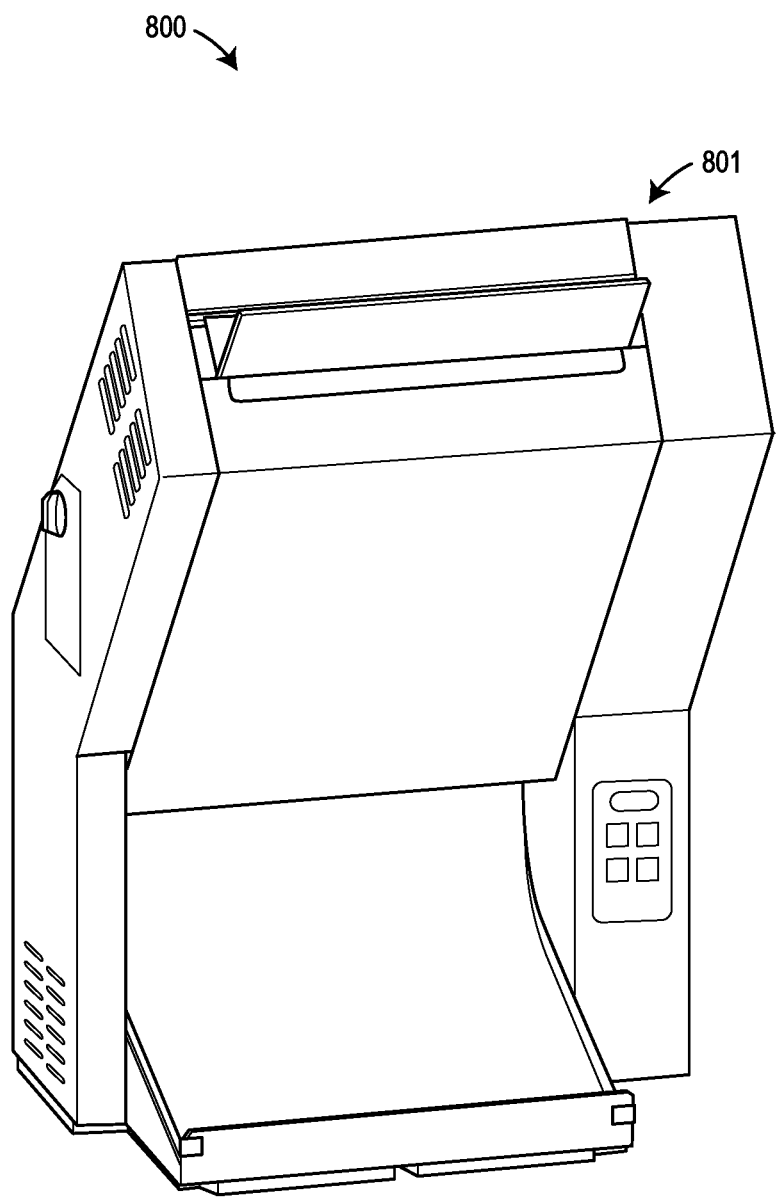
FIG. 8 is a toaster with an angled product feed comprising the conveyor belt system of FIG. 3.

The metal slats 140 of the conveyor belt 110 work in conjunction with the reactive surface 111 to allow for the conveyor belt system 100 to receive and convey a food product without creating any marks or deformities on the food product. The described system 100 is used in a horizontal toaster 700 illustrated in FIG. 7, an angled toaster 800 illustrated in FIG. 8, and a vertical toaster 901 illustrated in FIG. 9.

To better understand the benefits of the conveyor belt system 100 according to the present disclosure, a discussion of the shortcomings of existing conveyor toasters is provided here. Existing conveyor toasters usually include a product feed where the product is inserted into an opening of the toaster. For example, in the angled toaster 800 in FIG. 8, the product travels down an angled shoot 801, usually angled at about 45 degrees, and is received by a conveyor belt 110 (not shown in FIG. 8). The conveyor belt 110 receives the food product and urges it through an opening between the conveyor belt and a heated platen. In some conveyor toasters, the food product is compressed through this opening between the platen and the conveyor belt, also called a compressive gap, to process the food product. Problems arise, however, when the food product is caught at an angle in the compressive gap, thereby causing the food product to tear or become deformed. To overcome this problem, some feed conveyor toasters include a tapered platen, like the reactive surface 111 illustrated in FIGS. 3 and 6, to create a wider clearance to receive the food product. Nonetheless, these toasters are still vulnerable to tearing and pinching the food product. Additionally, existing wire conveyor belts that utilize attachable plates create gaps between the plates where the food product can get pinched. The conveyor belt system 100 of FIG. 3 provides a larger clearance, or opening, to receive food product than existing systems, by virtue of the hinge action of the metal slats, and thereby reduces the chances of pinching and deforming food products. The system 100 not only provides a larger clearance for receiving food product, but also advantageously exerts a larger compressive force on the food product upon entry on the belt to smoothly grab and pull the food product along the conveyor belt without marking or deforming the food product.

Figure 6:
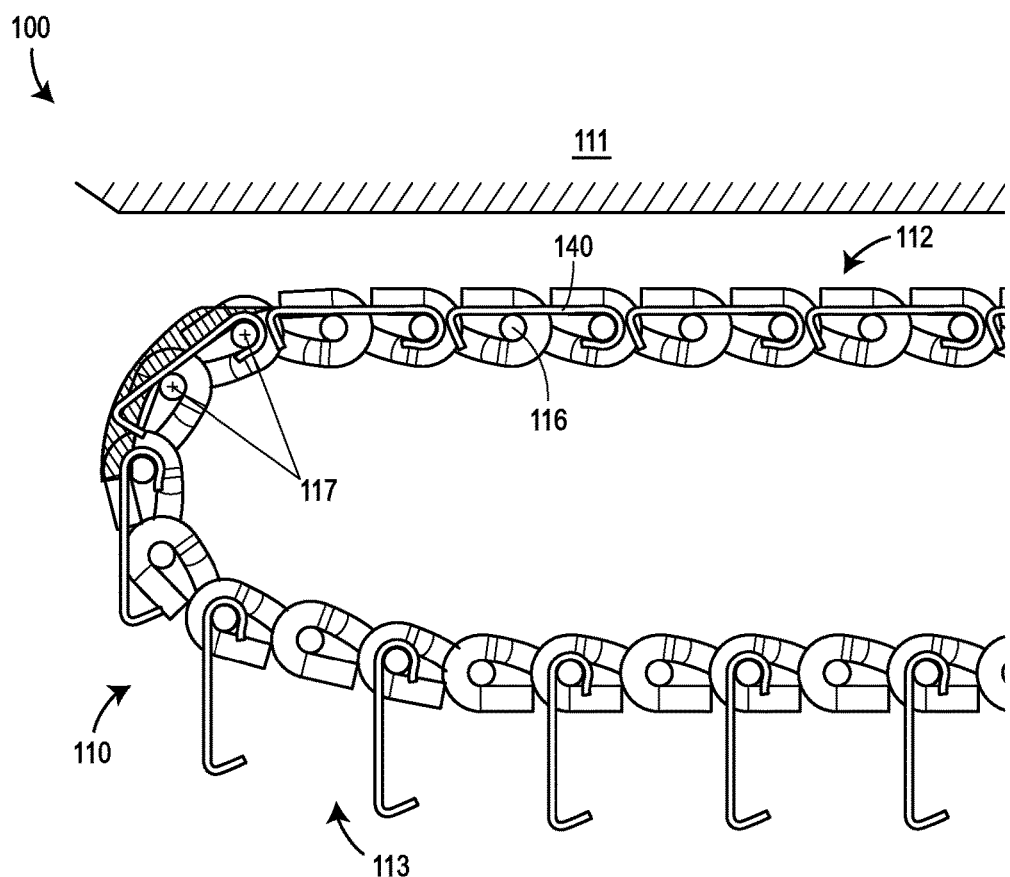
FIG. 6 is cross sectional view of the conveyor belt system of FIG. 3.

Thus, the conveyor belt system 100 used in a conveyor toaster advantageously provides a larger clearance for receiving food product, exerts a larger compressive force on the food product against the reactive surface, and minimizes the number of gaps in the conveyor belt surface where a food product is likely to get pinched than existing conveyor belts. As best illustrated in FIG. 6, which is a cross-sectional view of the system illustrated in FIG. 3, the rotational movement or hinge action of the slats 140 and the ratio of slats 140 to rods 116 of the conveyor belt 110, which allow the conveyor belt system 100 to provide a large clearance for receiving the food product. At the point in the system 100 of receiving the food product, the slat 140 creates an angled opening. In contrast, conventional conveyor toasters do not have an angled opening for receiving food product and instead receive the food product close to the rounded end of the conveyor belt. Referring back to FIG. 6, the trailing edge 143 of the slats 140 creates an overhang of the belt 110, which allows the system 100 to have a larger clearance, or area, for receiving the food. As the slat 140 rotates about a driving mechanism (not shown in FIG. 6), the trailing edge 143 creates a trajectory that extends beyond the circumference of the conveyor belt 110. This trajectory is formed by the trailing edge 143 of the slat 140 as it rotates about a driving mechanism and is depicted in FIG. 6 by a shaded region. This shaded region illustrates the additional clearance for receiving a food product provided by the conveyor belt system according to the disclosure.

The trajectory of the overhang of the conveyor belt system 100 is created by the ratio of slats 140 to spaced metal rods 116 of the conveyor belt 110. For example in FIG. 6 the conveyor belt 110 comprises at least twice as many rods 116 as it comprises slats 140. The length of the slat 140 is related to the pitch 117 of the conveyor belt 110, or the distance between each spaced rod 116. In the illustrated embodiments, the length of the slat 140 is at least twice the length of the pitch 117 of the conveyor belt 110. Accordingly, each metal slat 140 hingedly couples to one rod 116 at the leading edge 142, the body 141 overlies the following, second rod 116, and the slat 140 terminates at the trailing edge 143, just short of a third rod 116. However, in another embodiment, the slat 140 can have a length of three or even four times the pitch 117 of the conveyor belt 110, or put differently, the conveyor belt 110 comprises a slat 140 attached to every third or every fourth rod 116, as opposed to a slat 140 attached to every other rod 116 as is illustrated in the system 100 of FIG. 3. This ratio of slats 140 to rods 116 allows for a greater clearance area while also minimizing the number of spaces in the conveyor belt surface that may pinch the food product. Further, lower ratios of slats to rods, or a longer slats, provide greater compressive action for advantageously "grabbing" a food product upon entry into the conveyor belt system 100.

Another problem with existing conveyor toasters is that the food product often gets pinched in the spaces between the slats of the conveyor belt. For example, a wire conveyor belt having metal plates attached to each of the spaced rods includes gaps, or sites for pinching, between each plate. The metal plates do not create an overhang because the two ends of the plates are fixed to the rods of the conveyor belt. Thus, when the plates rotate about a driving mechanism, the plates separate to form gaps in the conveyor belt surface, and then come back together and form a flat surface after rotating about the driving mechanism. The gaps in the conveyor surface typically begin to close at the point where the conveyor belt receives the food product, but there are still significant opportunities for the conveyor belt to pinch the food product between the plates as the plates come together.

The present conveyor belt system 100 overcomes this problem in a few ways. Firstly, the slats 140 overly at least two rods 116, thus form fewer gaps in the conveyor belt surface 112 when the slats 140 rotate about the driving mechanism. With fewer gaps, there are fewer sites for pinching food product. Secondly, unlike existing wire conveyor belts with metal plates or slats, the slats 140 of the present disclosure are only fixed to the conveyor belt 110 at the leading edge 142 of the slat 140. This configuration can advantageously close the gaps between the slats 140 as the slats 140 rotate about the driving mechanism. And thirdly, the trailing edge 143 is curved or bent inwardly, which further closes the gap between the metal slats and additionally provides a smooth surface to prevent marking or tearing the food product.

The conveyor belt system 100 exerts a compressive force on the food product to smoothly grab the food product from the feed and pull the food product through the compression gap without marking or deforming the product. The reactive surface 111, which can be a heated or non-heated platen or a second conveyor belt, is parallel to the top side 112 of the conveyor belt 110. The reactive surface 111 and the conveyor belt 110 together grab the food product and carry the food product through the conveyor belt system 100. The reactive surface 111 may be tapered at the end to help with receiving the food product from the feed. The reactive surface 111 may also be coated with Teflon to reduce the friction between the food product and the reactive surface 111.

The cross-section of the conveyor belt system 100 in FIG. 6 illustrates the rotational motion of the metal slats 140. The slats 140 transition from a hanging, vertical position at the bottom side 113 of the conveyor belt 110 to a horizontal position at the top side 112 of the conveyor belt 110, where the slats 140 lay flat to provide the flat support surface 112. As the slats 140 rotate, the trailing edge 143 of the slats 140 creates the trajectory that extends beyond the circumference of the conveyor belt 110. After receiving the food product, the metal slats 140 apply a compressive force on to the food product over a greater area illustrated by the shaded region. The added compressive force can advantageously help overcome the frictional force between the food product and the reactive surface 111 to allow the conveyor belt system 100 to grab the food product and pull the product through the compressive gap of the system 100.

Figure 9:
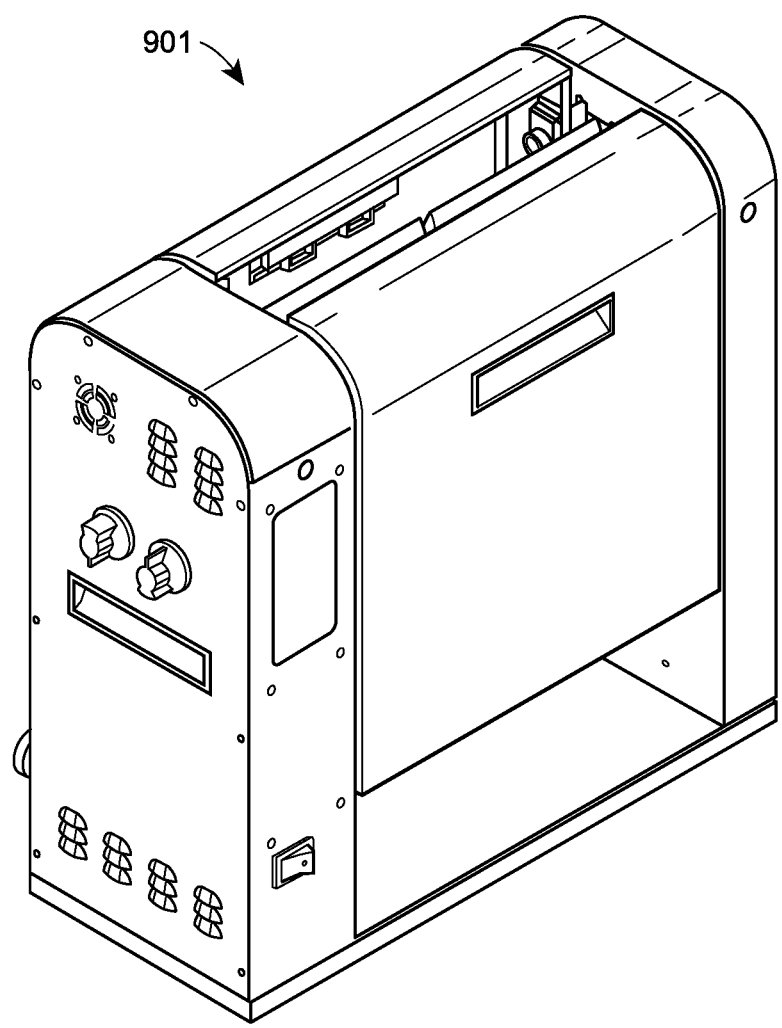
FIG. 9 is a perspective view of a vertical toaster using the conveyor belt system of FIG. 3.
Figure 10:
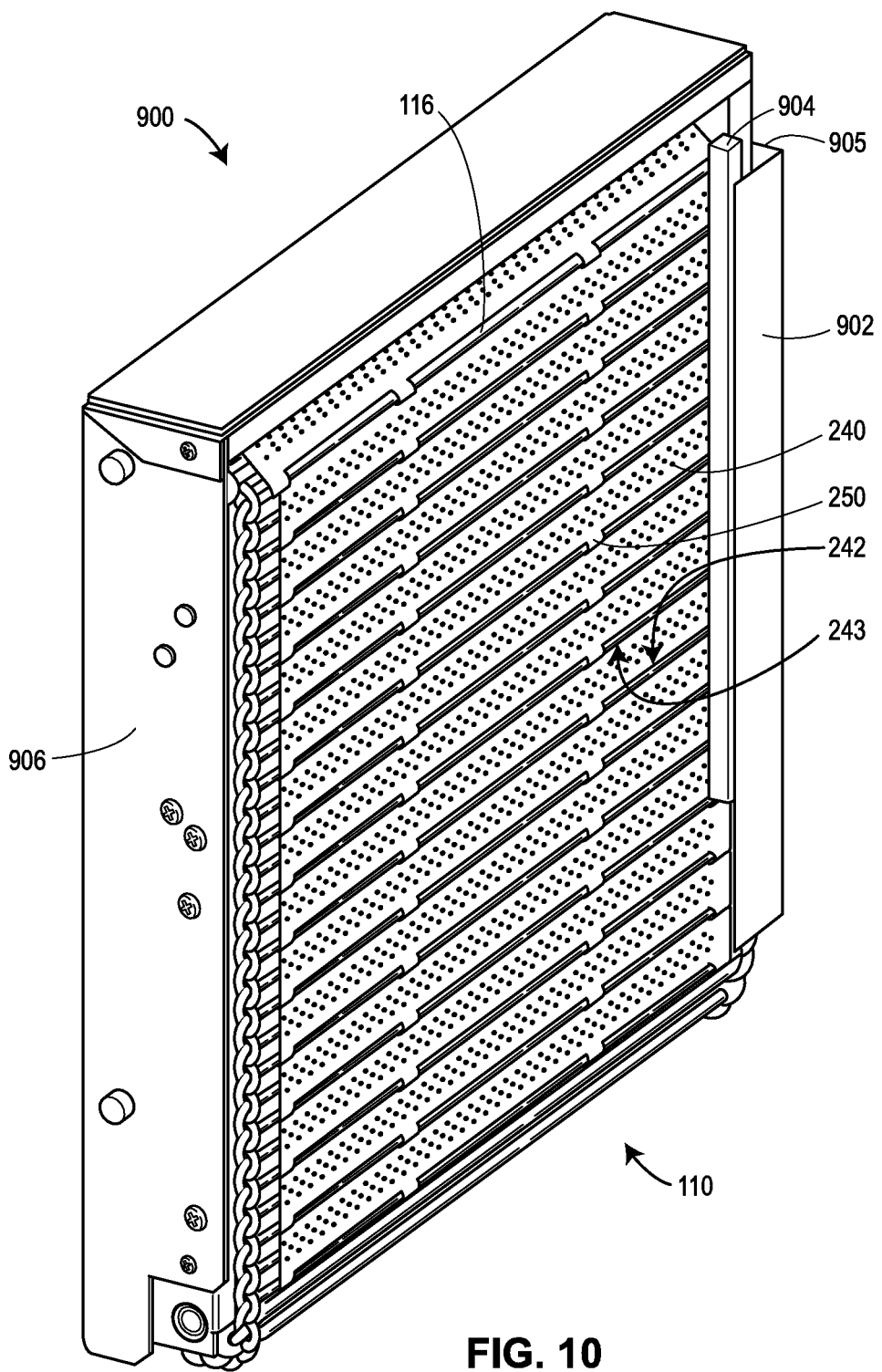
FIG. 10 is a perspective view of the conveyor belt system of FIG. 3 implemented in the vertical toaster of FIG. 9.
Figure 11:
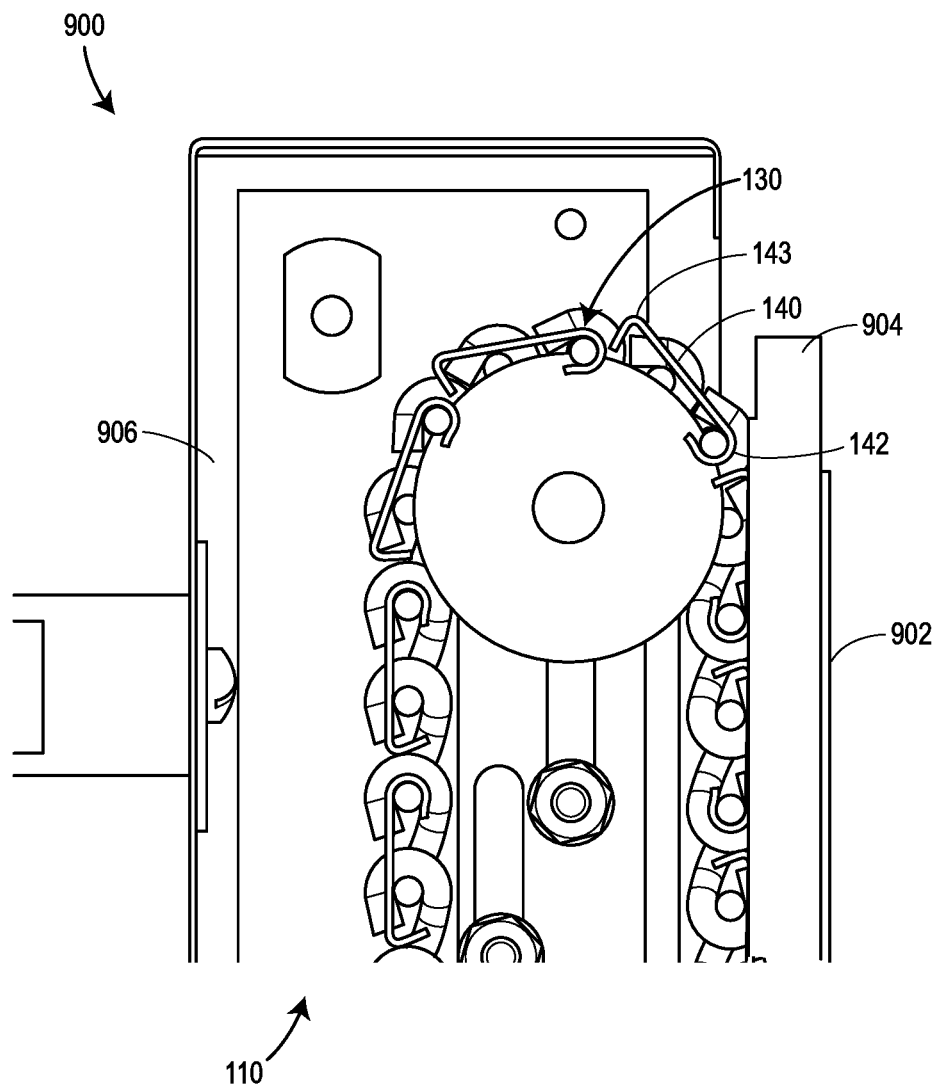
FIG. 11 is a cross-sectional side view of the vertical conveyor belt system of FIG. 10.

The conveyor belt system 100 of FIG. 3 may be used in a vertical toaster 901, as illustrated in FIG. 9. The vertical toaster 901, also disclosed in U.S. Application Publication No. US 2010/02757789, has multiple removable and adjustable conveyor belts that receive a food product at an opening at the top of the toaster. The vertical toaster 901 comprises an additional mechanism to keep the metal slats 140 from rotating at the return loop and interfering with the conveyor belt system 100. Better illustrated in FIG. 10, a vertical conveyor belt system 900 utilizing the second alternative hanging slats 240 includes a guide structure 902 that runs the full length of the conveyor belt 110. In one embodiment, the system 900 includes the guide structure 902 on both ends of the conveyor belt 110. The guide structure 902 includes a bar 904 that interacts with the slats 240 at the edge of the conveyor belt 110 and keeps the slats 240 flat so they do not flip about the hinged coupling 130 of the leading edge 242 of the slat 240 and the rod 116. The guide bar 904 is fixed to a bracket 905 that attaches the guide bar 904 to the conveyor belt housing 906. FIG. 11 is a side view of the vertically-oriented conveyor belt system 900 utilizing the first alternative slat 140 and illustrates the rotation of the metal slats 140 and how the guide bar 904 keeps the slats 140 from rotating about the hinged joint 130. This guiding structure 902 may also be implemented in a horizontal toaster to keep the slats from hanging vertically at the return loop. Another embodiment of the present disclosure may utilize the hanging slats to sweep away crumbs and other debris away from the conveyor belt system.

In accordance with a preferred embodiment of the conveyor belt system, the compression gap can be adjusted according to varying sizes of food product. In one embodiment, the conveyor belt can be adjusted with respect to the reactive surface as illustrated and explained in U.S. Application Publication No. US2010/0275789. In another embodiment, the reactive surface can be adjusted with respect to the conveyor belt as is known in the art.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A conveyor belt system for compressing a food product, comprising:
   a conveyor belt and an opposing reactive surface, the conveyor belt having a top side and a bottom side, the top side being substantially parallel to and facing the reactive surface;
   the conveyor belt further comprising a plurality of spaced rods and a plurality of substantially flat slats, the slats comprising a base portion having a leading edge and a trailing edge relative to a direction of conveyance travel of the conveyor belt, the leading edge being coupled to one of the plurality of rods and the trailing edge being free of attachment, so as to provide a hinged joint arranged to provide at least partial rotation at the leading edge of each slat,
   wherein the trailing edge of each slat comprises a bent portion, the bent portion comprising an arm extending at an acute angle relative to an axis defined by the base portion.

2. The conveyor belt system according to claim 1, wherein the slats are coupled to a first spaced rod and extend over at least a second spaced rod, the second spaced rod being immediately adjacent to the first spaced rod.

3. The conveyor belt system according to claim 2, wherein the slats extend over the first spaced rod and the second spaced rod, wherein the slats substantially abut without contacting a third spaced rod, the third spaced rod being immediately adjacent to the second spaced rod.

4. The conveyor belt system according to claim 1, wherein the slats comprise at least one channel portion at the leading edge, the channel portion capable of receiving one of the plurality of rods and permitting at least partial rotation of the slat.

5. The conveyor belt system according to claim 1, wherein the slats comprise multiple channel portions protruding from the leading edge, each channel portion comprising a u-shaped hook member.

6. The conveyor belt system according to claim 5, wherein the slats comprise multiple notches along the trailing edge, the notches being disposed in positions along the trailing edge that correspond to the positions of the channel portions protruding from the leading edge.

7. The conveyor belt system according to claim 1, wherein the plurality of spaced rods are provided by a wire conveyor belt scaffolding.

8. The conveyor belt system according to claim 1, wherein the slats comprise a material selected from the group consisting of metals, plastics, and ceramics.

9. The conveyor belt system according to claim 1, wherein the plurality of slats create a substantially flat support surface for conveying a food item at the top side of the conveyor belt.

10. The conveyor belt system according to claim 1, wherein the conveyor belt system is arranged for the conveyor belt to run in a substantially horizontal direction and each slat hangs vertically from the hinged joint at a bottom return side of the conveyor belt, the bottom return side of the conveyor belt traveling in a direction opposite the direction of conveyance.

11. The conveyor belt system according to claim 1, wherein each slat has a length along the direction of conveyance that is greater than a distance between two immediately adjacent spaced rods.

12. The conveyor belt system according to claim 1, wherein a top conveyance side of the conveyor belt system is adapted to compress the food product against the reactive surface.

13. The conveyor belt system according to claim 1, wherein the reactive surface is a heated platen for heating the food product or a second conveyor belt.

14. A food heating device comprising:
   a conveyor belt and at least one platen for heating food products, the conveyor belt comprising a top side and a bottom side, the top side being substantially parallel to and facing the platen;
   the conveyor belt further comprising a plurality of spaced rods and a plurality of substantially flat metal slats, the slats comprising a base portion having a leading edge and a trailing edge relative to a direction of conveyance travel of the conveyor belt, the leading edge being coupled to one of the plurality of rods and the trailing edge being free of attachment, so as to provide a hinged joint arranged to provide partial rotation at the leading edge of each slat;
   wherein the conveyor belt is configured to compress the food product against the at least one platen while moving relative to the at least one platen,
   wherein the slats comprise multiple channel portions protruding from the leading edge, each channel portion comprising a u-shaped hook member, and
   wherein the slats comprise multiple notches along the trailing edge, the notches being disposed in positions along the trailing edge that correspond to the positions of the channel portions protruding from the leading edge.

15. The conveyor belt system according to claim 14, wherein the slats couple to a first spaced rod and extend over at least a second spaced rod, the second spaced rod being immediately adjacent to the first spaced rod.

16. The conveyor belt system according to claim 15, wherein the slats extend over the first spaced rod and the second spaced rod, wherein the slats substantially abut without contacting a third spaced rod, the third spaced rod being immediately adjacent to the second spaced rod.

17. The conveyor belt system according to claim 14, wherein the slats comprise at least one channel portion at the leading edge, the channel portion capable of receiving one of the plurality of rods and permitting at least partial rotation of the slat (around an axis defined by the respective rod).

* * * * *